Dec. 28, 1926.  1,612,441
M. G. IVANDICK ET AL
ELECTRICAL SWITCH
Filed Feb. 27, 1923     2 Sheets-Sheet 1
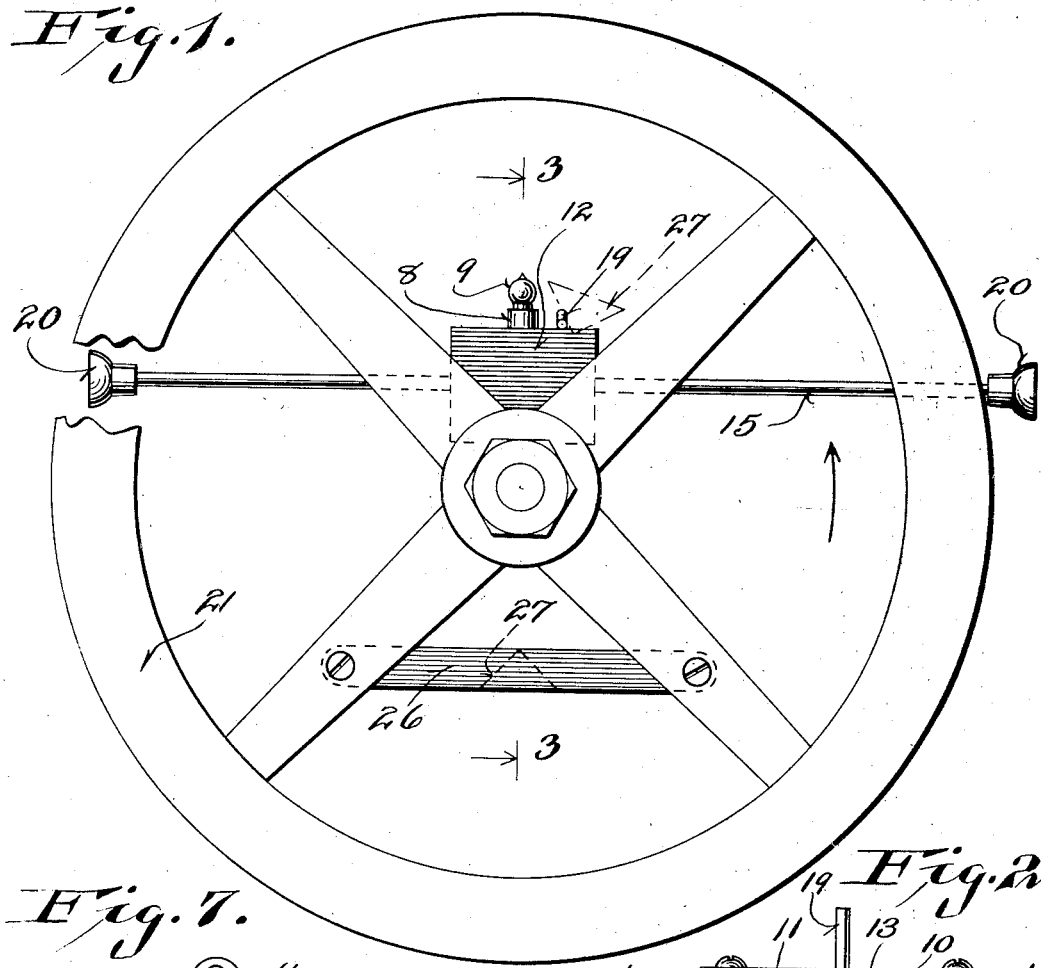
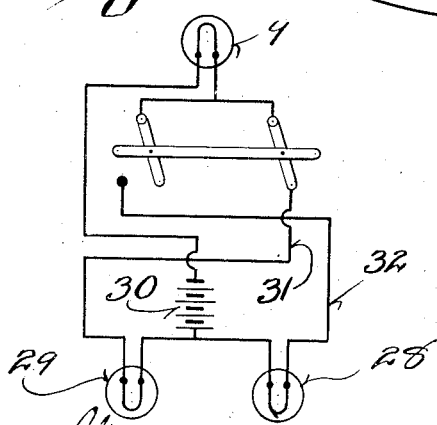
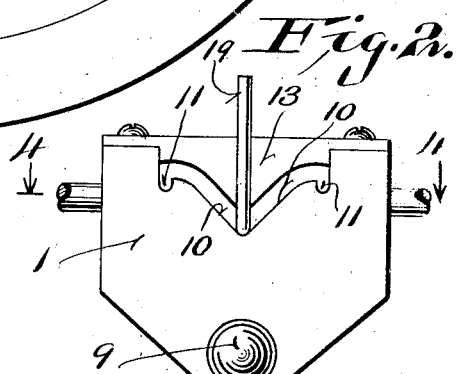
Inventors.
Mathew G. Ivandick
Alfred E. Budde Dec. 28, 1926.

M. G. IVANDICK ET AL 1,612,441

ELECTRICAL SWITCH

Filed Feb. 27, 1923

Inventors
Mathew G. Ivandick
Alfred E. Budde

Patented Dec. 28, 1926.

1,612,441

UNITED STATES PATENT OFFICE.

MATHEW G. IVANDICK AND ALFRED E. BUDDE, OF NORTH CHICAGO, ILLINOIS.

ELECTRICAL SWITCH.

Application filed February 27, 1923. Serial No. 621,672.

This invention relates to electric switches and is particularly directed to an electric switch associated with an automobile signal system.

Objects of this invention are to provide an electric switch which will control the right and left turning signal lamps of an automobile, which may be readily manipulated by the hand of the driver without removing his hand from the steering wheel, which will be automatically returned to normal position, which when operated by the right or left hand will close the circuit for the right or left lamp, respectively, and which is provided with a tell-tale light to apprise the driver of the closing of the signal lamp circuit.

Further objects are to provide a signal lamp controlling switch which is simple and compact in construction, which is of attractive appearance, which may be readily attached to the steering post, and which may be readily and cheaply produced.

An embodiment of the invention is shown in the accompanying drawings in which—

Figure 1 is a plan view of an automobile steering wheel equipped with a switch and automatic resetting means, showing in dotted lines the position of the trip cam when the cam is beginning the tripping operation.

Figure 2 is a front view of the switch, with parts broken away and drawn to an enlarged scale.

Figure 3 is a fragmentary sectional view, corresponding roughly to a section on line 3—3 of Figure 1.

Figure 4 is a horizontal sectional view on the line 4—4 of Figure 2.

Figure 5 is a plan view of the switch, with the upper cover and certain portions of the mechanism removed.

Figure 6 is a sectional view taken on the line 6—6 of Figure 4.

Figure 7 is a diagrammatic view, showing the wiring for the signal lamps and tell-tale light.

Referring more particularly to the drawings, it will be seen that the switch mechanism proper is mounted within a housing, which consists of a front plate and integrally formed side and rear plates. The rear plate 2 is provided with rearwardly projecting brackets 3. which cooperate with a strap 4 to clamp the steering post 5 between them when such strap is drawn into engagement by means of the bolts 6, (see Figure 5). The front plate is extended downwardly, as indicated in Figure 2, and is apertured and provided with an insulating bushing 7, within which is mounted the socket 8 of the tell-tale lamp 9.

It is to be noted from reference to Figures 2 and 3 that the front plate does not extend up to the top of the casing, but is provided with cam surfaces 10, which form a V-shaped depressed portion centrally of the front plate. These cam surfaces terminate in notches 11 at their extreme ends, for a purpose hereinafter to be described. The cover 12 is provided with a downwardly extending lip 13, which corresponds to the cam surfaces 10 and forms therewith cam slots. This cover is held in place by means of screws and lugs, as illustrated in Figure 6. The bottom of the housing is formed of an insulating plate 14, which is similarly held in position by screws and lugs, as illustrated in Figure 6.

A transverse operating rod 15, is passed through the aligned apertures in the side walls 16 of the housing, and is passed through a centrally positioned operating member or cam member 17. This cam member is locked to the rod 15 by means of a pin 18, (see Figure 3), such pin projecting through the cam slots in the front plate and terminating in an upwardly extending trip arm 19. Any suitable means may be employed for retaining the pin 18 in position, as for instance, the cotter pins shown in Figures 3, 4 and 6. The extreme outer ends of the operating rod 15 are provided with cup-shaped thumb pieces 20, which are positioned immediately below the rim 21 of the steering wheel.

The cam member 17 cooperates with a resilient contact strip 22, which is secured to the insulating base 14, and when moved sidewise depresses the corresponding end of the resilient strip 22, forcing it into contact with the pairs of strips 23 or 24 and respectively joining said strips and thereby closing the electrical circuits connected with such strips.

It is to be noted that the inner ends, or juxtaposed ends, of the respective pairs of strips 23 and 24 are slightly upturned, so as to insure a yielding and adequate contact between the resilient member 22 and such strips, as may be seen from Figure 3. The cam member 17 normally does not deflect the strip or resilient member 22, as it is held centrally in neutral position by means of the helical springs 25, which are positioned about the rod 15 and bear upon opposite sides of the cam member 17 and against the inner sides of the side plates 16.

The steering wheel is provided with a transverse member 26, joining two of its spokes, and such member carries upon its lower side a trip cam 27, which is substantially triagular in cross-section. This trip cam, as may be seen from Figure 3, is in a position to engage the trip arm 19 when such arm is in elevated position, as shown on dotted lines in Figure 3.

The right and left-hand turning signal lamps indicated at 28 and 29, respectively, in the diagrammatic view shown in Figure 7, are joined to a common source of electrical energy, such as the storage battery 30. The other terminal of the storage battery is connected to the tell-tale lamp 9, and from such lamp to one member of each of the pairs of contacts 23 and 24 of the electrical switch, which is shown diagrammatically in Figure 7. The other member of the right-hand pair of contacts 24, (see Figure 5), is connected to the left-hand lamp 29 by means of the conductor 31, (see Figure 7), and the other member of the left-hand contacts 23, is connected by means of the conductor 32 with the right-hand lamp 28.

The operation of the apparatus is as follows: Assume that the driver wishes to turn to the left, as indicated in Figure 1. He presses the left-hand thumb cup 24 and forces the rod 15 towards the right. This operation is accomplished without removing either hand from the steering wheel, as the cups are immediately adjacent and below the rim of such wheel. This moves the cam member 17 to the right, compressing one of the springs 25 and depressing the right-hand end of the resilient contact piece 22, thereby electrically connecting the members of the pair of contacts 24 and closing the circuit for the left-hand turning signal lamp 29, through the tell-tale light 9.

It is to be noted that the lower surface of the cam member 17 is rounded, the center of curvature being approximately the intersection of the center lines of the rod 15 and the pin 18, (see Figure 3). The pin 18 rides up the cam slot and drops into the appropriate notch 17, thereby locking the switch in closed position and maintaining the illumination of the left-hand turning signal lamp 29. The driver is apprised of the lighting of the lamp 29 by the lighting of the small tell-tale light 9. As the left-hand turn is nearing completion, the trip cam member 27 contacts with the then elevated trip arm 19 and raises the pin 18 out of the notch 11, allowing the cam member 17 to move back to neutral position under the influence of the springs 25, thereby opening the lamp circuit and restoring the parts to their neutral position.

It will be seen that the turning of the steering wheel automatically resets the switch and opens the lamp circuits. However, if the turning movement of the steering wheel is of such a limited extent that the trip cam 27 does not contact with the tripping arm 19, such arm may readily be manually tripped, thereby restoring the switch parts to neutral position.

It will thus be seen that an automatic switch and associated mechanism has been provided which is eminently suited to the demands of automobile practice, and that such switch readily controls the turning signal lamps. It will also be seen that means have been provided, whereby the driver is instantly apprised of the lighting of either of the signal lamps.

It will further be seen that the switch may be readily attached to standard types of automobiles in a very simple manner, and that such switch is of attractive and ornamental appearance and enhances the general appearance of the steering post and steering wheel.

We claim:

An electric switch comprising a casing having a front portion and side portions, a rod extending through said side portions and slidably carried thereby, an insulating block carried centrally by said rod and located within said casing, springs tending to maintain said block in central position within said casing, a lever projecting outwardly from said block and having an upturned arm located externally of said casing, the front of said casing having a V-shaped slot through which said lever projects, and having depressions at the ends of said slot adapted to temporarily afford a seat for said lever, and means for dislodging said lever from either of said depressions, a spring contact member located below said block and having upwardly curved ends on opposite sides of said block, and stationary contacts mounted below the ends of said spring contacts, said spring contact member being depressed into contact with one of said stationary contact members when said block is moved from its central position.

In testimony that we claim the foregoing we have hereunto set our hands at No. Chicago, in the county of Lake and State of Illinois.

MATHEW G. IVANDICK.
ALFRED E. BUDDE.